United States Patent
Lake et al.

(10) Patent No.: US 8,825,276 B2
(45) Date of Patent: Sep. 2, 2014

(54) MAINTENANCE SYSTEMS AND METHODS FOR USE IN ANALYZING MAINTENANCE DATA

(75) Inventors: Peter James Lake, Auburn, WA (US); Davis Scott Kinney, Everett, WA (US); Anne Kao, Bellevue, WA (US); Stephen R. Poteet, Bellevue, WA (US); Steven C. Runo, Bellevue, WA (US); Jay Kevin McCullough, Belleville, IL (US); Steven D. Chapman, O'Fallon, MO (US); Yun-Ho Sikora, St.Louis, MO (US); David Charles Augustine, Seattle, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 13/242,652

(22) Filed: Sep. 23, 2011

(65) Prior Publication Data

US 2013/0079972 A1    Mar. 28, 2013

(51) Int. Cl.
G07C 5/08 (2006.01)
G05B 23/02 (2006.01)

(52) U.S. Cl.
CPC .......... *G07C 5/0808* (2013.01); *G05B 23/0229* (2013.01); *G05B 23/0281* (2013.01); *G05B 23/0275* (2013.01); *G05B 23/0278* (2013.01); *G05B 23/0283* (2013.01); *G05B 23/0248* (2013.01)
USPC ....................................................... 701/31.6

(58) Field of Classification Search
USPC ....................................................... 701/31.6
See application file for complete search history.

(56) References Cited

U.S. PATENT DOCUMENTS

| | | | |
|---|---|---|---|
| 6,725,137 B2 * | 4/2004 | Eagleton et al. | 701/32.9 |
| 6,829,527 B2 * | 12/2004 | Felke et al. | 701/29.3 |
| 7,860,618 B2 | 12/2010 | Brandstetter et al. | |
| 7,949,444 B2 * | 5/2011 | Mukherjee | 701/31.4 |
| 8,019,503 B2 * | 9/2011 | Andreasen et al. | 701/29.6 |
| 8,068,951 B2 * | 11/2011 | Chen et al. | 701/31.4 |
| 2002/0007237 A1 * | 1/2002 | Phung et al. | 701/33 |
| 2008/0005617 A1 | 1/2008 | Maggiore et al. | |
| 2009/0276438 A1 | 11/2009 | Lake et al. | |
| 2009/0312897 A1 | 12/2009 | Jamrosz et al. | |
| 2010/0077046 A1 | 3/2010 | Rigal et al. | |
| 2010/0121520 A1 | 5/2010 | Yukawa et al. | |
| 2012/0116630 A1 | 5/2012 | Howell et al. | |

OTHER PUBLICATIONS

U.S. Appl. No. 12/686,653, filed Jan. 13, 2010.
Search and Examination Report for Application No. GB1216858.9 dated Jan. 29, 2013, 7 pgs.

* cited by examiner

*Primary Examiner* — John R Olszewski
*Assistant Examiner* — Todd Melton
(74) *Attorney, Agent, or Firm* — Armstrong Teasdale LLP

(57) ABSTRACT

Methods and maintenance systems for use in analyzing data related to maintenance of at least one vehicle are disclosed. One example method includes receiving at least one fault message, receiving a maintenance event log for a vehicle. The maintenance event log including at least one maintenance event associated with the at least one fault message. The example method further includes automatically identifying a corrective action within a most recent maintenance event of the at least one maintenance event and storing a diagnostic entry including the at least one fault message and the identified corrective action, such that the diagnostic entry is retrievable from the computing device to evaluate a subsequent like fault message.

20 Claims, 3 Drawing Sheets

MAINTENANCE SYSTEMS AND METHODS FOR USE IN ANALYZING MAINTENANCE DATA

BACKGROUND

The field of the disclosure relates generally to maintenance systems and methods and, more particularly, to analyzing data related to maintenance of at least one vehicle.

Various types of vehicles are known to include monitoring technologies, which enable vehicles to detect abnormal conditions and report the abnormal conditions as fault messages associated with one or more components of the vehicle. Aircrafts, for example, often include systems to monitor components of the aircraft during flight and report fault messages when abnormal conditions are identified. Fault messages may be reported to an operator of the aircraft and/or to another system or individual to ensure appropriate maintenance is pursued to address the abnormal conditions underlying the fault messages. Additionally, yet separately, during maintenance of a vehicle, reports are often generated, which indicate action codes and/or text descriptions of the repair and/or other maintenance procedure performed by the maintenance personnel on the vehicle.

BRIEF DESCRIPTION

In one aspect, a method for use in analyzing data related to maintenance of at least one vehicle is provided. The method includes receiving at least one fault message and receiving a maintenance event log for a vehicle. The maintenance event log including at least one maintenance event associated with the at least one fault message. The example method further includes automatically identifying a corrective action within a most recent maintenance event of the at least one maintenance event and storing a diagnostic entry including the at least one fault message and the identified corrective action, such that the diagnostic entry is retrievable from the computing device to evaluate a subsequent like fault message.

In another aspect, a maintenance system is provided. The maintenance system includes a memory device configured to store at least one fault message and a maintenance event log and a processor coupled to the memory device. The maintenance event log including a plurality of maintenance events associated with the at least one fault message. The processor is configured to identify a corrective action within a most recent maintenance event of the plurality of maintenance events corresponding to the at least one fault message and store a diagnostic entry in said memory, such that the diagnostic entry is retrievable from the computing device to evaluate a subsequent like fault message. The diagnostic entry includes the at least one fault message and the identified corrective action.

In yet another aspect, one or more non-transitory computer-readable storage media having computer-executable instructions embodiments thereon is disclosed. When executed by at least one processor, the computer-executable instructions cause the at least one processor to retrieve a most recent maintenance event of a maintenance event log including a plurality of maintenance events associated with at least one fault message, identify a corrective action within a most recent one of the plurality maintenance events, and store a diagnostic entry including the at least one fault message and the identified corrective action, such that the diagnostic entry is retrievable to evaluate a subsequent like fault message.

The features, functions, and advantages that have been discussed can be achieved independently in various embodiments or may be combined in yet other embodiments further details of which can be seen with reference to the following description and drawings.

DETAILED DESCRIPTION

The subject matter described herein relates to analyzing data related to maintenance of a vehicle to provide a diagnostic entry, which includes a fault message and a corrective action associated with the fault message.

In one embodiment, technical effects of the methods, systems, and computer-readable media described herein include at least one of: (a) receiving at least one fault message, (b) receiving a maintenance event log for a vehicle, (c) automatically identifying a corrective action within a most recent maintenance event of the maintenance event log, and (d) storing a diagnostic entry including the at least one fault message and the identified corrective action, such that the diagnostic entry is retrievable from the computing device to evaluate a subsequent like fault message.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
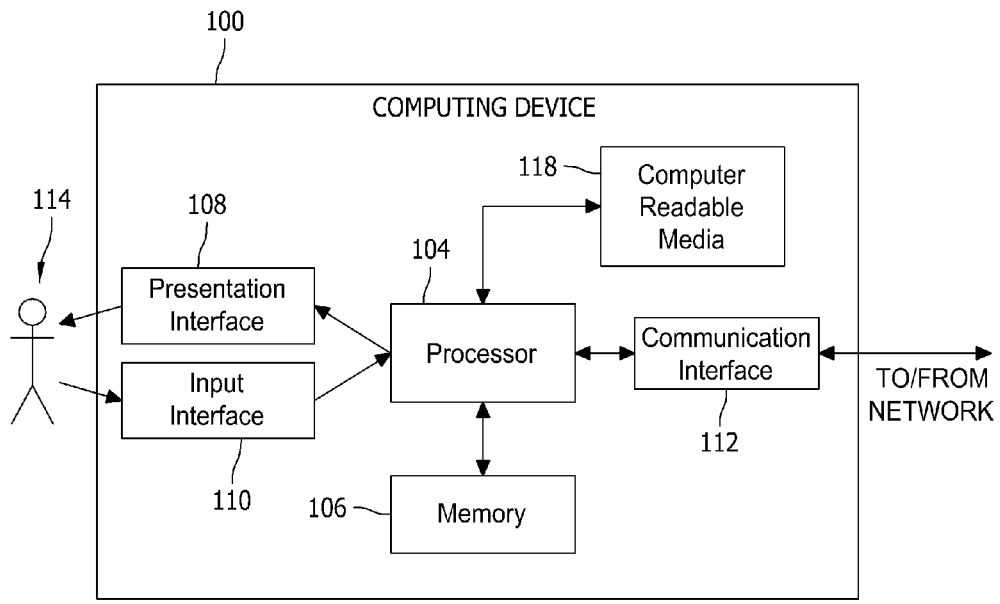
FIG. 1 is a block diagram of an exemplary computing device.

FIG. 1 is a block diagram of an exemplary computing device 100 that may be used to automatically generate a production operating system. In the exemplary embodiment, computing device 100 includes a memory 106 and a processor 104 that is coupled to memory 106 for executing programmed instructions. Processor 104 may include one or more processing units (e.g., in a multi-core configuration). Computing device 100 is programmable to perform one or more operations described herein by programming memory 106 and/or processor 104. For example, processor 104 may be programmed by encoding an operation as one or more executable instructions and providing the executable instructions in memory device 106.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 104, cause processor 104 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, maintenance event log, diagnostic entries, fault messages, and/or any other type of data suitable for use with the methods and systems described herein.

In the exemplary embodiment, computing device 100 includes a presentation interface 108 that is coupled to processor 104. Presentation interface 108 outputs (e.g., display, print, and/or otherwise output) information such as, but not limited to, installation data, configuration data, test data, error messages, and/or any other type of data to a user 114. For example, presentation interface 108 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 108 includes more than one display device. In addition, or in the alternative, presentation interface 108 may include a printer.

In the exemplary embodiment, computing device 100 includes an input interface 110 that receives input from user 114. For example, input interface 110 may be configured to receive selections, requests, credentials, and/or any other type of inputs from user 114 suitable for use with the methods and systems described herein. In the exemplary embodiment, input interface 110 is coupled to processor 104 and may include, for example, a keyboard, a card reader (e.g., a smart-card reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 108 and as input interface 110.

In the exemplary embodiment, computing device 100 includes a communication interface 112 coupled to memory 106 and/or processor 104. Communication interface 112 is coupled in communication with a remote device, such as another computing device 100. For example, communication interface 112 may include, without limitation, a wired network adapter, a wireless network adapter, and/or a mobile telecommunications adapter.

Instructions for operating systems and applications are located in a functional form on non-transitory memory 106 for execution by processor 104 to perform one or more of the processes described herein. These instructions in the different embodiments may be embodied on different physical or tangible computer-readable media, such as memory 106 or another memory, such as a computer-readable media 118, which may include, without limitation, a flash drive, CD-ROM, thumb drive, floppy disk, etc. Further, instructions are located in a functional form on non-transitory computer-readable media 118, which may include, without limitation, a flash drive, CD-ROM, thumb drive, floppy disk, etc. Computer-readable media 118 is selectively insertable and/or removable from computing device 100 to permit access and/or execution by processor 104. In one example, computer-readable media 118 includes an optical or magnetic disc that is inserted or placed into a CD/DVD drive or other device associated with memory 106 and/or processor 104. In some instances, computer-readable media 118 may not be removable.

Figure 2:
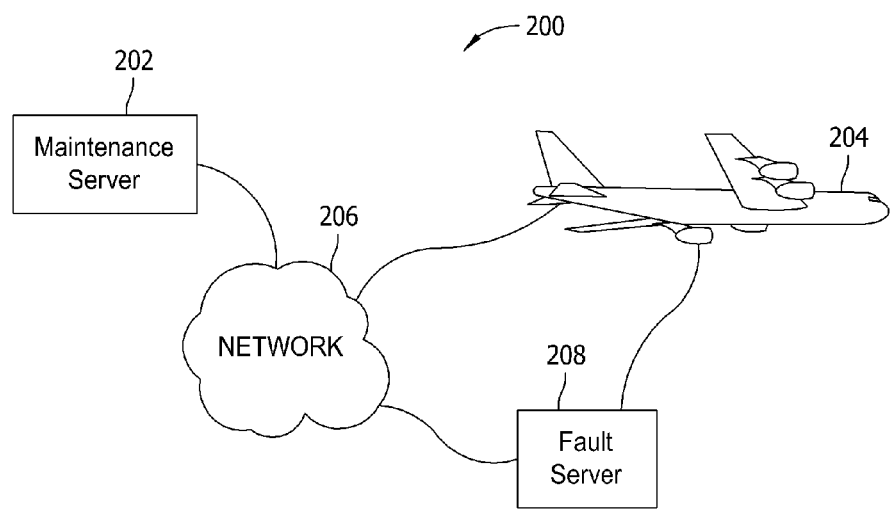
FIG. 2 is a block diagram of an exemplary maintenance system.

FIG. 2 illustrates an exemplary maintenance system 200, which includes a maintenance server 202 and a vehicle 204. While vehicle 204 is illustrated and referred to herein as an aircraft, it should be appreciated that other types of vehicles may be included in the other maintenance system embodiments. As shown, maintenance server 202 is coupled to aircraft 204 through a network 206. Network 206 may include, without limitation, the Internet, an intranet, a local area network (LAN), a wide area network (WAN), a mobile network, a virtual network, and/or another suitable network for communicating data between maintenance server 202, aircraft 204, and/or other computing devices. In use, aircraft 204 transmits one or more maintenance related messages, such as, for example, fault messages, to maintenance server 202 through network 206. In turn, maintenance server 202 receives the one or more maintenance related messages from aircraft 204.

Additionally, or alternatively, maintenance system 200 includes a fault server 208 coupled to maintenance server 202 through network 206. As shown in FIG. 2, fault server 208 may be coupled directly to aircraft 204 and/or coupled to aircraft 204 through network 206. Fault server 208 is configured to receive at least fault messages from aircraft 204 and transmit such messages to maintenance server 202. Fault server 208 may be configured to provide messages between maintenance server 202 and aircraft 204 for a variety of reasons, including for example, when maintenance server 202 has limited or no direct communication with aircraft 204.

In the exemplary embodiment, maintenance server 202 and fault servers 208 are examples of computing devices 100. It should be understood that, in various embodiments, each of maintenance server 202 and fault server 208 may include multiple computing devices 100. In one example, maintenance server 202 includes a first computing device 100 located proximate at a maintenance site for use by maintenance personnel and a second computing device 100 located remote from the maintenance site for use by a data analyzer. In at least one example, maintenance server 202 and fault server 208 include a single computing device 100.

In the exemplary embodiment, during operation, one or more fault messages are generated by aircraft 204. Fault messages may include any message generated indicating a failure, an error, a malfunction, or other abnormal condition of a component, a system, and/or operation of aircraft 204. In one example, aircraft 204 generated a fault message, indicating a bleed fan error associated with a modulation valve. In the exemplary embodiment, the fault message is transmitted from aircraft 204 to fault server 208 through network 206. In turn, fault server 208 receives the fault message and stores the fault message in memory device 106. The fault message may be transmitted from aircraft 204 to fault server 206, while aircraft 204 is in-flight or when aircraft 204 is grounded. Fault server 208 subsequently transmits the fault message to maintenance server 202, which receives the fault messages and stores the fault message in memory 106. Alternatively, in other embodiments, aircraft 204 transmits the fault message directly to maintenance server 202, which receives the fault messages and stores the fault message in memory 106.

In response to a fault message, aircraft 204 may be subjected to one or more maintenance sessions. Depending on the type and/or the severity of the fault message, the maintenance session may be scheduled immediately or at a convenient time. During a maintenance session, maintenance is performed on aircraft 204 to identify and/or remedy a cause of the fault message. In various examples, one or more components may be subjected to a corrective action, such as, without limitation, removing, replacing, swapping, repairing, checking, and/or deferring, etc. User 114 associated with maintenance of aircraft 204 generates maintenance event logs, which are received by maintenance server 202 from user 114 and stored in maintenance server 202. Maintenance event log may include one or more maintenance events, which may include, without limitation, individual, single, or multiple corrective actions, part numbers, part names, test results, check results, and/or descriptions, etc.

It should be appreciated that aircraft 204 may be subjected to multiple maintenance sessions in response to one or more fault messages. Accordingly, maintenance event logs may include multiple maintenance events associated with one or more fault messages.

Figure 3:
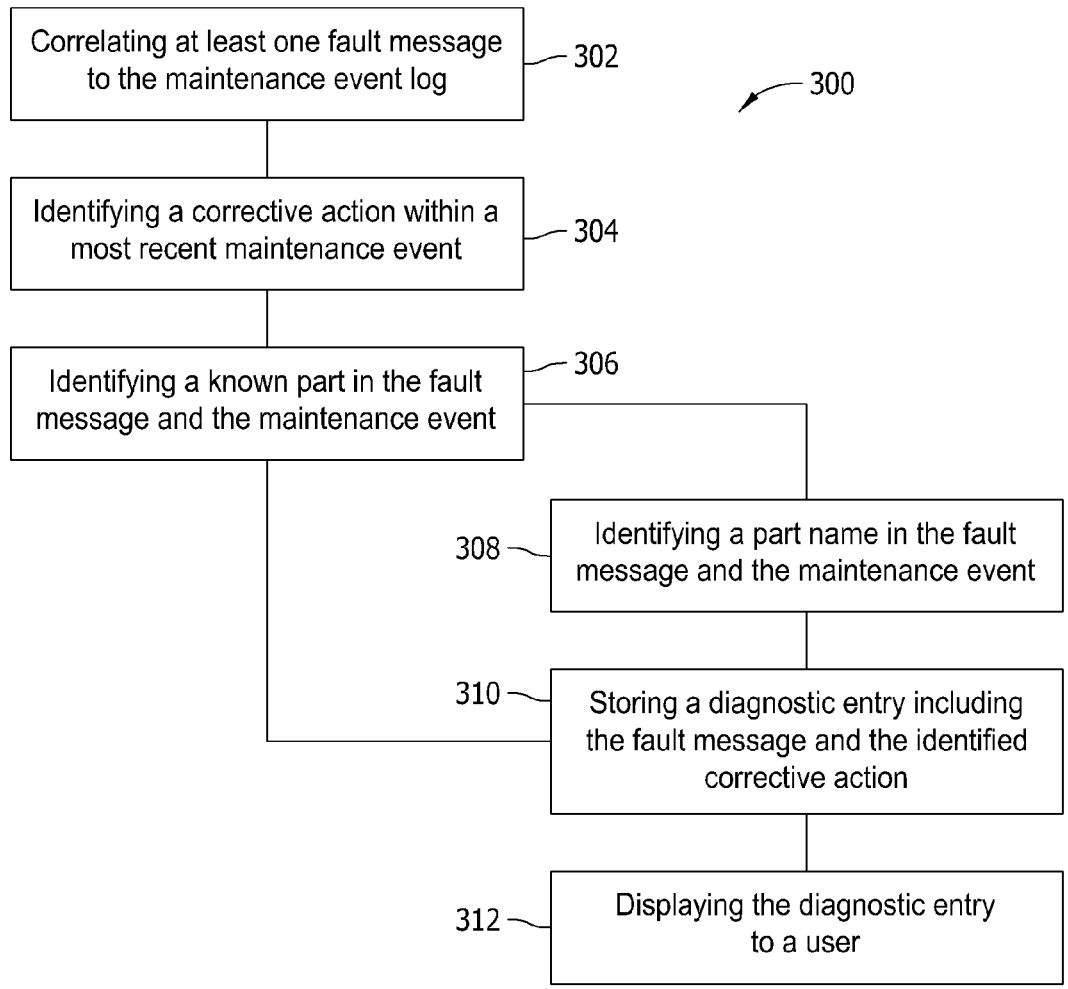
FIG. 3 illustrates a flow diagram of an exemplary method for use in analyzing data related to maintenance of at least one aircraft.

Maintenance server 202 employs one or more of aspects described herein to analyze fault messages and maintenance event logs. Specifically, for example, FIG. 3 illustrates an exemplary method 300 that may be utilized by maintenance server 202 to analyze the fault messages and the maintenance event log. It should be appreciated, however, that maintenance system 200 is not limited to method 300 and may perform a variety of methods consistent with the description herein. Likewise, method 300 should not be understood to be limited to maintenance system 200.

Method 300 includes correlating 302 the fault message to the appropriate maintenance event log. In the exemplary embodiment, processor 104 correlates the fault message and the maintenance event log, potentially based on identification of aircraft 204, location of the aircraft 204, date/time data included in the fault messages and the maintenance event log, and/or descriptions included the fault messages and the maintenance event log. In one example, maintenance server 202 is configured to correlate a fault message from January 1 at 12:30 am from aircraft 204, with a maintenance event from January 3 at 9:52 pm for aircraft 204, where no other maintenance events were recorded in the interim time period of the maintenance event log for aircraft 204. In various embodiments, correlating fault message and maintenance events may include converting date/time data from one format (e.g., Zulu date/time) to another form (e.g., local date/time at maintenance server 202), thereby providing efficient comparison of date/time data between the fault message and the maintenance events.

When the fault message and maintenance event log are correlated, method 300 includes identifying 304 a corrective action in the most recent maintenance event associated with the fault message. In the exemplary embodiment, processor 104 identifies the most recent maintenance event within the maintenance event log. The most recent maintenance event is identified, because the most recent maintenance event generally reflects the most recent corrective action taken to address the associated fault message. In several embodiments, other corrective actions, identified in other maintenance events, are less instructive, because prior corrective actions (if any) have resulted in subsequent maintenance events, rather than a cessation of the fault message.

In the exemplary embodiment, processor 104 identifies the corrective action by searching the most recent maintenance entry from last word toward the first word to identify a corrective action within the maintenance entry. By searching from the last word toward the first word, processor 104 is likely to identify the last corrective action in the most recent maintenance event. In this manner, if aircraft 204 ceases transmitting the fault message, processor 104 infers that the last corrective action within the most recent maintenance event caused of the cessation of the fault message. It should be appreciated that processor 104 may search maintenance events in different orders to identify a corrective action in the most recent or other maintenance event in other maintenance server embodiments.

Figure 4:
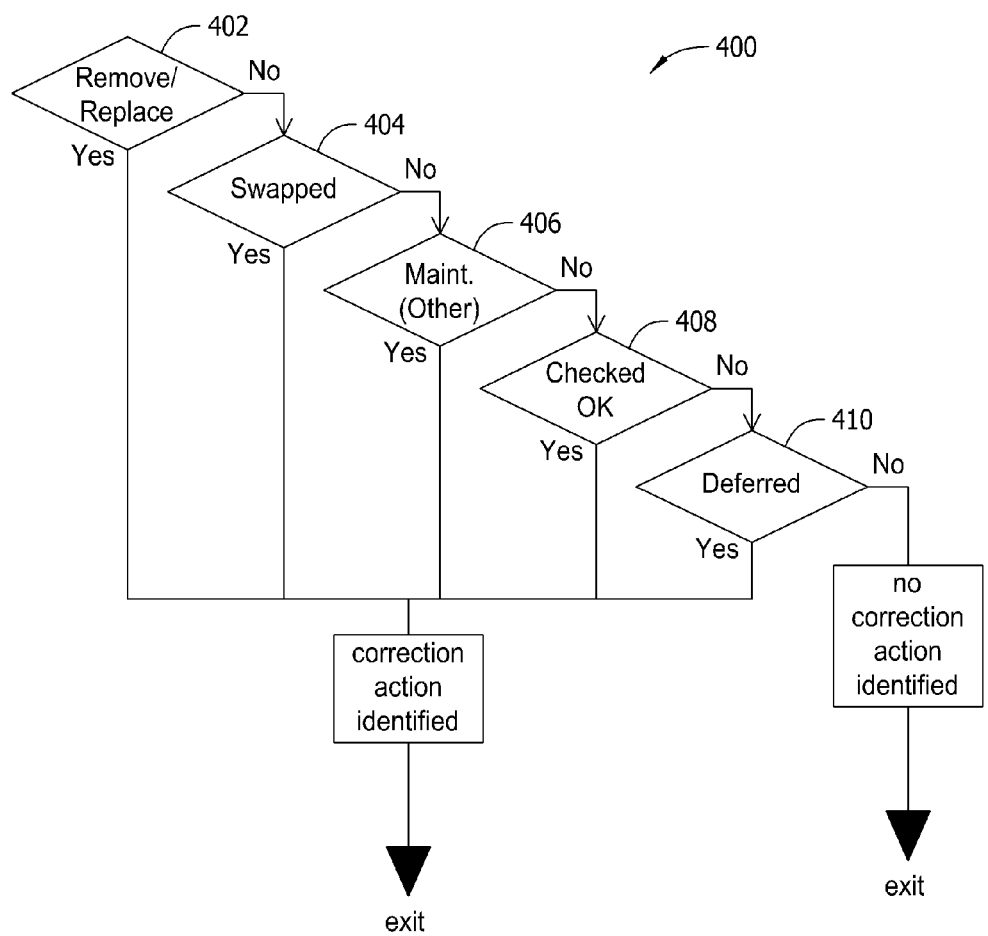
FIG. 4 illustrates a block diagram of an exemplary hierarchy of corrective actions.

Additionally, or alternatively, processor 104 may search the most recent maintenance event according to a hierarchy of corrective actions to identify 304 the corrective action. FIG. 4 illustrates an exemplary sequential hierarchy 400 of corrective actions utilized by processor 104 in the exemplary embodiment to identify the corrective action. More specifically, processor 104 searches the maintenance event for corrective actions in the first tier 402. If remove or replace is in the maintenance event, remove or replace is identified 304 as the corrective action and method 300 proceeds to step 306. If, however, neither remove nor replace is present in the maintenance event, processor 104 proceeds to search the maintenance event for corrective actions in a second tier 404. If swapped is in the maintenance event, swapped is identified 304 as the corrective action and method 300 proceeds to step 306. If, however, swapped is not present in the maintenance event, processor 104 proceeds to search the maintenance event for corrective actions in a third tier 406. Processor 104 proceeds to sequentially search the most recent maintenance event for corrective actions included in the first tier 402 through the second tier 404, third tier 406, fourth tier 408, and fifth tier 410 of sequential hierarchy 400. If a corrective action is present, method 300 exist to step 306 to identify a known part number. Alternatively, if none of the corrective action listed in hierarchy 400 are present within the maintenance event, method 300 may exist and/or provide a message to user 114 of maintenance server 202, via presentation interface 108, indicating no corrective action is present in the most recent maintenance action. User 114, in turn, may elect to proceed without identifying a corrective action, manually search the maintenance entry for a corrective action, select a different maintenance event from the maintenance event log, and/or exist method 300.

Hierarchy 400 permits exemplary method 300 to prioritize certain corrective actions over other corrective actions, in order to determine a cause and/or remedy of the fault message. For example, replacing a part, may be more indicative of a cause and/or potential remedy for a fault message than checking a part and/or deferring maintenance. It should be appreciated that different hierarchies including different corrective actions in different orders may be utilized to identify corrective actions in other embodiments, potentially depending on the types of corrective action taken during maintenance events and/or the likelihood of one or more actions resulting in cessation of the fault message.

Referring again to FIG. 3, after the corrective action is identified, method 300 proceeds to identifying 306 a known part number in the most recent maintenance event. Specifically, in the exemplary embodiment, processor 104 searches the fault message and/or maintenance event for a known part number associated with the corrective action. In one example, when the fault message indicates a "bleed fan error modulation valve," the fault message and/or maintenance event may include a known part number for the particular valve. In such an example, processor 104 identifies the known part number and coverts the part number to text. Alternatively, if a known part number is not included, processor 104 searches the fault message and/or maintenance event, via text searching, to identify 308 a part name associated with the corrective action. It should be appreciated that in several embodiments, identifying a known part number and/or a part name may be omitted.

After the part number, if any, is identified, exemplary method 300 includes storing 310 a diagnostic entry in memory 106. In the exemplary embodiment, the diagnostic entry includes the fault message and the identified corrective action taken with respect to the fault message. Additionally, in the exemplary embodiment, the diagnostic entry may include the part number and or part name of the part associated with the corrective action. The diagnostic entry is retrievable from memory 106 to evaluate subsequent like fault messages for aircraft 204. More specifically, a plurality of diagnostic entries provide a database usable to diagnose future occurrences of the fault messages as related to aircraft 204.

In various embodiments, method 300 includes displaying 312, at presentation interface 108, the diagnostic entry to user 114. The diagnostics entry may be displayed to user 114, prior to or after being stored in memory 106, such that user 114 is permitted to approve or disapproved of the diagnostic entry. User 114 may approve or disapprove of the diagnostic entry for a variety of reasons, potentially based on his/her knowledge about aircraft 204, experience in repairing aircraft 204, and/or other knowledge/experience of user 114. In other embodiments, the diagnostic entry may be stored in memory 106, without being displayed to user 114.

Once one or more diagnostic entries are stored in memory 106, user 114 may present a new fault message to maintenance server 202, via input interface 110. In turn, processor 104 is configured to search memory 106 for the fault message, retrieve the diagnostic entry, if any, from memory 106, and present the fault message for presentation to user 114 at presentation interface 108, to be viewed and/or understood by user 114. User 114 may then utilize the diagnostic entry and information contained therein to perform maintenance on aircraft 204. In this manner, prior fault messages and prior maintenance event logs are combines into multiple diagnostic entries in a common memory and suitable to suggest proper corrective actions for future occurrences of fault messages.

Further, in the exemplary embodiment, processor 104 is configured to assign a confidence level to the diagnostic entry based on like corrective actions included in maintenance events associated with like fault messages. Specifically, for example, for the fault message "bleed fan error associated with a modulation valve," processor 104 may understand that approximately 75% of maintenance entries, which caused cessation of the fault message, included replacement of the modulation valve. Accordingly, a 75% confidence level may be assigned to a diagnostic entry including "replace" as the corrective action of replace and a part number/name identifying the modulation value. Additionally, approximately 6% of maintenance entries, which caused cessation of the fault message, included repair of the modulation valve. In turn, processor 104 assigns a confident level of 6% to diagnostic entry including "repair" as the corrective action of replace and a part number/name identifying the modulation value. It should be appreciated that various different confidence levels may be assigned to one or more diagnostics entries, potentially depending on the frequency of faults messages and the relationship between the corrective action and the cessation of the fault message from aircraft 204. As such, processor 104 assigns a confidence level to each diagnostic entry associated with the fault message to provide an indication of which corrective actions, potentially based on higher confidence levels, should be pursued and in which order.

In the exemplary embodiment, maintenance server 202 is configured to revise the stored diagnostic entry in response to a maintenance event appended to the maintenance event log. Specifically, for example, when a diagnostic entry is stored in memory 106, maintenance server 202 presumes that the fault message has ceased and the corrective action is the root cause of the cessation. Accordingly, if a maintenance event log is appended with an additional maintenance event, processor 104 may revise the diagnostic entry, because the most recent maintenance event within the maintenance event log has changed. As such, processor 104 may periodically search maintenance event log to identify maintenance events added, since generating a diagnostic entry from that maintenance event log. Additionally, or alternatively, maintenance server 202 may be configured to inhibit analysis of maintenance event logs and/or faulty message until a predetermined interval after the most recent maintenance event. For example, maintenance server 202 may inhibit analysis of fault messages and/or maintenance event logs for approximately 15 days, 1 month, 2 months or another suitable interval, since a maintenance event has been appended to the maintenance event log.

It should be appreciated that one or more aspects of the present disclosure transform a general-purpose computing device into a special-purpose computing device when configured to perform the functions, methods, and/or processes described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in analyzing data related to maintenance of at least one vehicle, said method being implemented by a computing device, said method comprising:
    receiving at least one fault message transmitted from the at least one vehicle;
    receiving a maintenance event log for a vehicle, the maintenance event log including at least one maintenance event;
    automatically identifying, by the computing device, a most recent corrective action for the at least one maintenance event including inferring, in response to the at least one vehicle ceasing transmission of the at least one fault message, that the most recent corrective action caused cessation of the fault message; and
    storing, within the computing device, a diagnostic entry including the at least one fault message and the identified corrective action, such that the diagnostic entry is retrievable from the computing device to evaluate a subsequent like fault message.

2. The method of claim 1, wherein identifying the corrective action includes searching a most recent maintenance event from about the last word toward the first word to identify a most recent corrective action within a maintenance entry.

3. The method of claim 2, wherein identifying the corrective action includes searching the most recent maintenance event for individual corrective actions according to a sequential hierarchy.

4. The method of claim 1, wherein identifying the corrective action includes searching a most recent maintenance event for individual corrective actions according to a sequential hierarchy.

5. The method of claim 1, further comprising identifying at least one part number included in a most recent maintenance event and associated with the identified corrective action.

6. The method of claim 5, wherein storing the diagnostic entry includes storing the diagnostic entry including the at least one part number.

7. The method of claim 1, further comprising assigning a confidence level to the diagnostic entry based on like corrective actions included in maintenance events associated with like fault messages.

8. The method of claim 1, further comprising providing the diagnostic entry for presentation to a user at a display device.

9. The method of claim 1, further comprising correlating the at least one fault message for the vehicle to the maintenance event log for the vehicle.

10. A maintenance system for use in analyzing data related to maintenance of at least one vehicle, said maintenance system comprising:
a memory device configured to store at least one fault message transmitted by at least one vehicle and a maintenance event log, the maintenance event log including a plurality of maintenance events; and
a processor coupled to said memory device, said processor configured to:
identify a most recent corrective action for the plurality of maintenance events corresponding to the at least one fault message, including inferring, in response to the at least one vehicle ceasing transmission of the at least one fault message, that the most recent corrective action caused cessation of the fault message; and
storing a diagnostic entry in said memory, such that the diagnostic entry is retrievable from the computing device to evaluate a subsequent like fault message, the diagnostic entry including the at least one fault message and the identified corrective action.

11. The maintenance system of claim 10, wherein the processor is further configured to search a most recent maintenance event according to a sequential hierarchy.

12. The maintenance system of claim 10, wherein the processor is further configured to identify at least one part number included in a most recent maintenance event and associated with the corrective action.

13. The maintenance system of claim 12, wherein the stored diagnostic entry includes the at least one part number.

14. The maintenance system of claim 10, wherein the processor is further configured to revise the stored diagnostic entry in response to a maintenance event appended to the maintenance event log.

15. The maintenance system of claim 10, wherein the processor is further configured to assign a confidence level to the diagnostic entry based on like corrective actions included in maintenance events associated with like fault messages.

16. The maintenance system of claim 10, wherein the processor is further configured to retrieve the diagnostic entry from said memory and provide the diagnostic entry for presentation to a user, when a subsequent like fault message is input by a user.

17. One or more non-transitory computer-readable storage media having computer-executable instructions embodied thereon, wherein when executed by at least one processor, the computer-executable instructions cause the processor to:
receive at least one fault message transmitted from at least one vehicle;
retrieve a maintenance event of a maintenance event log including a plurality of maintenance events;
identify a most recent corrective action for the plurality of maintenance events, including inferring, in response to the at least one vehicle ceasing transmission of the at least one fault message, that the most recent corrective action caused cessation of the fault message; and
store a diagnostic entry including the at least one fault message and the identified corrective action, such that the diagnostic entry is retrievable to evaluate a subsequent like fault message.

18. The one or more non-transitory computer-readable storage media of claim 17, wherein when executed by the at least one processor, the computer-executable instructions cause the processor to search a most recent maintenance event from the about last word toward the first word for individual corrective actions according to a sequential hierarchy to identify the corrective action.

19. The one or more non-transitory computer-readable storage media of claim 17, wherein when executed by the at least one processor, the computer-executable instructions further cause the processor to identify at least one part number included in a most recent maintenance event and associated with the corrective action, the stored diagnostic entry including the at least one part number.

20. The one or more non-transitory computer-readable storage media of claim 17, wherein when executed by the processor, the computer-executable instructions further cause the at least one processor to assign a confidence level to the diagnostic entry based on like corrective actions included in maintenance events associated with like fault messages.

* * * * *